United States Patent [19]

Stamper et al.

[11] 4,256,797
[45] Mar. 17, 1981

[54] CONTOURED RESILIENT VEHICLE TRIM PANEL

[75] Inventors: Richard W. Stamper, Toledo; Richard L. Rhonehouse, Holland, both of Ohio

[73] Assignee: Inmont Corporation, Clifton, N.J.

[21] Appl. No.: 719,977

[22] Filed: Sep. 2, 1976

[51] Int. Cl.³ .............................. B32B 7/02; B60J 7/00; B29D 27/00; B32B 5/18

[52] U.S. Cl. .................................... 428/215; 428/218; 428/315; 428/322; 428/224; 428/90; 296/214; 264/321; 264/322

[58] Field of Search ............................ 296/137 A, 214; 428/315, 31, 215, 224, 320, 322, 90, 218; 264/320, 321, 322

[56] References Cited

U.S. PATENT DOCUMENTS

| | | | |
|---|---|---|---|
| 3,507,728 | 4/1970 | Bock et al. | 156/257 |
| 3,531,367 | 9/1970 | Karsten | 428/315 |
| 3,616,020 | 10/1971 | Whelan et al. | 156/244 |
| 3,637,459 | 1/1972 | Parish et al. | 161/161 |
| 3,755,063 | 8/1973 | Massey et al. | 428/310 |
| 3,861,994 | 1/1975 | Stark | 428/315 |
| 3,867,240 | 2/1975 | Doerfling | 296/137 A |
| 3,936,565 | 2/1976 | Good | 428/315 |
| 4,020,207 | 4/1977 | Alfter et al. | 428/315 |
| 4,043,589 | 8/1977 | Alfter | 296/137 A |
| 4,172,918 | 10/1979 | Doerer | 296/214 |
| 4,188,440 | 2/1980 | Doerer | 296/214 |
| 4,211,590 | 7/1980 | Steward et al. | 264/321 |

*Primary Examiner*—William R. Dixon, Jr.
*Attorney, Agent, or Firm*—Harness, Dickey & Pierce

[57] ABSTRACT

An improved contoured resilient vehicle trim panel and method of making same which is suitable for use as a decorative headliner adjacent to the interior undersurface of the roof panel of vehicles. The trim panel comprises a composite laminar sheet consisting of a pair of imperforate thermoplastic films disposed in spaced-apart relationship and tenaciously bonded in supported relationship to the face surfaces of an intervening coextensive thermoplastic foam core layer. The films and the closed cell foam core are comprised of a thermoplastic polymer having a glass transition temperature of at least 200° F. and a tensile modulus of at least $1.0 \times 10^5$ psi. A variety of decorative coatings and films can be secured to the concave face of the laminar sheet so as to achieve the desired decorative appearance. In accordance with the process aspects, the composite laminar sheet can be formed by the extrusion of the film in overlying relationship to the opposite faces of the foam layer at an elevated temperature, effecting a heat fusion thereof into a composite laminar sheet. The sheet thereafter, upon heating, can be thermoformed, such as by vacuum molding, into an appropriately contoured trim panel and the decorative facing sheet can be applied before, during the molding operation, or after the panel has been formed and trimmed as may be desired.

7 Claims, 4 Drawing Figures

CONTOURED RESILIENT VEHICLE TRIM PANEL

BACKGROUND OF THE INVENTION

The passenger compartment of vehicles incorporates a number of composite contoured trim panels in order to impart the desired aesthetic appearance and to further provide insulation against the transmission of noises into the interior of a passenger compartment. Such trim panels also serve as insulation against heat transmission and in some instances, provide safety protection to the passengers due to their impact absorption characteristics.

Of the several trim panels conventionally employed, the headliner of headlining panel adapted to be positioned adjacent to the underside of steel roof panels has presented a continuing problem due to its size, weight, cost in fabrication and installation, and requirements of stability and freedom from warpage over prolonged time periods in spite of the wide fluctuation in ambient temperature and humidity conditions. Cloth and fabric-backed plastic headlinings at one time had been in widespread use, which were of the so-called "cut-and-sew" type comprising a series of sections sewn together and which were supported at longitudinally spaced intervals by a series of bows or lifting wires extending transversely beneath the roof panel and joined at their ends to the side edges of the automobile body. Headlinings of the foregoing type were highly labor intensive and also costly to manufacture and to a large extent, have been replaced by so-called "snap-in" type headliners comprising one or a series of shape-retaining panels which are adapted to be supported along their peripheral edge by a trim channel extending adjacent to the roof panel of the automobile. Typical of such prior art "snap-in" headliners are those disclosed in U.S. Pat. Nos. 3,506,532 and 3,507,728, the substance of which are incorporated herein by reference.

While such snap-in headliner panels of the types heretofore known have overcome many of the problems associated with cloth and fabric-type prior art headliners, some problems still remain. For example, some prior art headliner constructions have necessitated the use of unsightly score lines or creases in order to enable the attainment of the desired contouring and installation of the panel in the vehicle. Other headliner constructions have been characterized by unsatisfactory mechanical properties, such as, for example, an excessive weight-to-strength-to-bulk ratio, while others have had insufficient resistance to sag or warpage as a result of severe fluctuations in ambient temperature and humidity conditions. While some headliner constructions have been adequate for use in small compact cars, such structures have been unacceptable for use in larger full-size vehicles due to the greater unsupported expanse of the headliner, resulting in objectionable sagging, particularly when exposed to elevated temperatures approaching 200° F. In order to overcome such structural shortcomings, it has heretofore been proposed to employ fiberglass reinforced plastic laminates, but such headliners have not received widespread commercial acceptance due to their high cost of manufacture and the relatively expensive tooling required.

The present invention provides a contoured resilient trim panel and method for producing such trim panel which overcomes many of the problems associated with snap-in type headliners of the types previously known. The trim panel of the present invention is of economical cost, is light in weight, has a desired high strength-to-weight ratio, is versatile in its use and application to different styling motifs and vehicle sizes, can readily be thermoformed such as by vacuum molding to the desired contour and can be formed to further include suitable embossments for visor recesses, speaker housings, dome lights and the like; is stable and heat resistant and does not undergo objectionable sagging even when heated to temperatures up to about 200° F.

SUMMARY OF THE INVENTION

The improvements achieved by the present invention in accordance with the article aspects thereof are obtained by a contoured resilient trim panel which is comprised of a composite laminar sheet consisting of a pair of imperforate thermoplastic films ranging in thickness from about 3 up to about 60 mils which are disposed in spaced-apart relationship and are bonded in supported relationship to the opposed face surfaces of an intervening coextensive thermoplastic foam layer which may range in thickness from about 1/32 up to about 1 inch. The foam layer is of a closed cell structure and is of a density ranging from about 3 up to about 6 pounds per cubic foot. The thermoplastic polymer, of which the film and the foam layer are comprised, consists of a thermoplastic polymer having a glass transition temperature (Tg) of at least 200° F. and a tensile modulus of at least $1.0 \times 10^5$ psi. The foam core of the composite laminar sheet is further characterized as being substantially rigid and compression resistant, and is preferably of a low-cell orientation pattern. The foam core layer further is possessed of good formability at moderate elevated temperatures and serves to maintain the continuous encapsulating films in appropriate spaced relationship so that the films can impart the requisite strength to the composite structure. Particularly satisfactory laminates possessed of the requisite mechanical and physical properties can be produced employing modified polystyrene resins comprising copolymers of styrene with other monomers, including ionomers such as maleic anhydride, is amounts of 2% up to about 15% by weight of the polymer.

It is further contemplated that the interior surface of the contoured laminate can be provided with a suitable decorative coating, film and/or fabric to further enhance its decorative appearance, as well as its sound and heat insulating properties. Particularly satisfactory results are achieved by bonding to the surface of the exposed film, a composite decorative sheet comprised of a resilient polyurethane foam having an embossed vinyl film bonded to the face thereof, and wherein the composite decorative sheet is perforated to enhance the sound insulation characteristics thereof.

In accordance with the method aspects of the present invention, the composite laminar sheet is produced by the extrusion and heat bonding of the thermoplastic films to the opposed faces of a foam core layer, which thereafter, upon subsequent reheating, can readily be thermoformed such as by vacuum forming, for example, into panels possessed of the desired contour and surface embossments. A decorative coating can be applied to one face surface of the molded laminar sheet before, concurrently with the thermoforming operation, of following the molding operation, as may be desired.

Additional advantages and benefits of the present invention will become apparent upon a reading of the description of the preferred embodiments taken in conjunction with the accompanying drawing.

DESCRIPTION OF THE PREFERRED EMBODIMENTS

Figure 1:
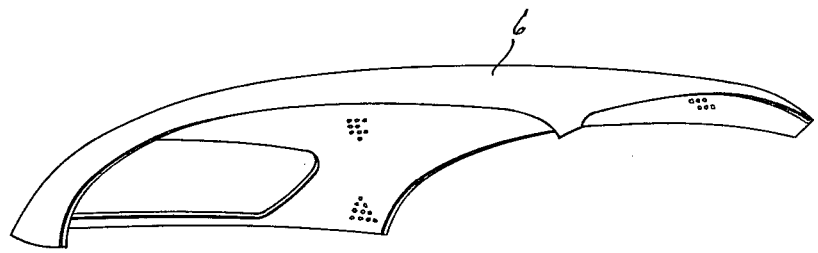
FIG. 1 is a perspective view of a snap-in type headliner constructed in accordance with the preferred embodiments of the present invention.

Referring now in detail to the drawings, and as may be best seen in FIG. 1, a contoured resilient trim panel constructed in accordance with the practice of the present invention is illustrated in FIG. 1 in the form of a headliner 6 for use in trimming the roof panel of the interior of passenger automobiles. Typically, headliners such as the headliner 6 are formed to provide a smoothly contoured concave interior surface generally conforming to the contour of the steel roof panel of the automobile body, and with the edges trimmed so as to engage appropriate channels or flanges provided along the interior body panel for supporting and retaining the headliner in appropriate disposition.

Figure 2:
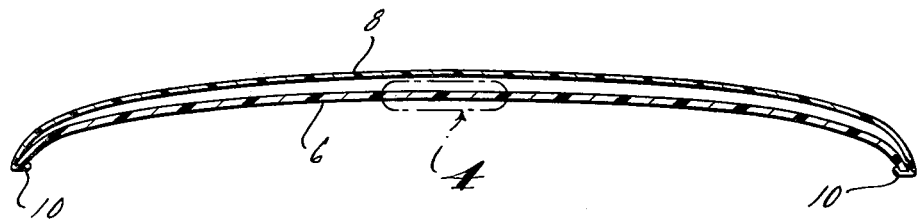
FIG. 2 is a transverse vertical sectional view illustrating the disposition of a snap-in headliner adjacent to the underside of a steel automobile roof panel.

As shown in FIG. 2, the headliner 6 is mounted in spaced relationship beneath the interior surface of a steel roof panel 8 of the automobile body, and the longitudinal side edges of the headliner are removably engaged by longitudinally extending members 10 welded or integrally formed along the interior edge of the roof. It will be appreciated that the headliner 6 must be of sufficient flexibility and resiliency to enable bending or deformation thereof during installation to effect engagement of the headliner edges with the mounting channels, forming thereby a so-called "snap-fit".

The excellent thermoformability properties of the trim panel of the present invention enables a contouring of the panel to any desired simple or compound curvature and further enables the provision of suitable emobssments or recesses at localized areas of the panel, as may be required to accommodate the visors adjacent to the windsheld header, a dome light in the center or adjacent to the sides of the headliner, as well as streamlined projecting sections for accommodating speakers, duct work for air circulation, or the like.

Figure 3:
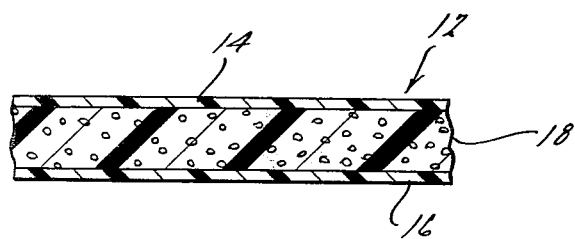
FIG. 3 is a magnified fragmentary sectional view of a composite laminar sheet.

The resilient trim panel is comprised of a composite laminar sheet, such as the sheet 12 shown in FIG. 3, comprising a pair of imperforate thermoplastic films 14, 16, which are disposed in spaced-apart relationship and are bonded in supported relationship to the face surfaces of an intervening coextensive thermoplastic foam core or layer 18. In the specific embodiment illustrated in FIG. 3, the bonding of the films 14, 16 to the core is preferably achieved by heat fusion, such as while the films are still in a substantially molten heat-softened condition upon emergence from an extrusion die, and are deposited directly in firm contact with the surface of the foam core. It is also contemplated that an appropriate adhesive can be employed for effecting a tenacious bond of the film to the foam core over substantially the entire interface therebetween.

The thickness of the films 14, 16 and of the foam core layer 18 can be varied so as to achieve the desired strength consistent with that necessary to span the distance between the supported edges of the trim panel without incurring objectionable sagging of the center portion thereof. For most applications, film thicknesses ranging from about 3 up to about 60 mils (0.003 to 0.060 inch) have been found satisfactory, while film thicknesses from about 5 to about 15 mils are usually adequate for most automobile headliner applications. The foam core layer may generally range in thickness of from about 1/32 up to about 1 inch, while thicknesses ranging from about 1/16 inch up to about ½ inch are satisfactory for most purposes. For most vehicle headliner applications, foam layers ranging from about 50 up to about 350 mils provide adequate support for the overlying bonded films ranging in thickness from 5 to 15 mils. The foam layer is further characterized as ranging from about 3 up to about 6 pounds per cubic foot in density, with densities from about 3 to about 4 pounds per cubic foot being particularly satisfactory.

The structure of the foam layer is characterized by closed cells, which preferably have configurations evidencing a low degree of orientation with respect to the direction of the sheet, and having an average cell size of less than 0.5 millimeter, and preferably less than about 0.25 millimeter. The thermoplastic polymer of which the foam layer is comprised, is further characterized as one which enables thermoforming of the composite laminate under moderate elevated temperature conditions employing commercially acceptable techniques, of which vacuum forming constitutes a preferred method. The thermoplastic foam polymer further is characterized as one having a tensile strength of at least 2,500 psi, and preferably at least 7,800 psi, as determined by ASTM D-638; a tensile modulus of at least $1.0 \times 10^5$ psi, preferably at least $4.5 \times 10^5$ psi; and a glass transition temperature (Tg) of at least 200° F., and preferably at least 235° F.

The thermoplastic polymer of which the films are comprised, also is characterized as having good formability characteristics employing moderate elevated temperatures and commercially available equipment, including vacuum forming techniques. The polymer is further characterized as having a tensile strength of at least 2,000 psi, preferably at least 4,500 psi (ASTM D-638); a tensile modulus of at least $1.0 \times 10^5$ psi, preferably at least $3.2 \times 10^5$; and a glass transition temperature of at least 200° F., and preferably at least 235° F. A further important characteristic of the film polymer is that it possesses sufficient toughness and impact resistance to withstand handling during the thermoforming operation, as well as during subsequent installation. An Izod impact strength of at least 0.5 foot pounds per inch, and preferably at least 3.2 foot pounds per inch (ASTM D-256), is desirable for this purpose.

A number of thermoplastic polymers are presently known which can be satisfactorily employed to form the specific structural arrangement of the composite laminate sheet so as to achieve the benefits of the present invention. While a variety of thermoplastic polymers can be satisfactorily employed for this purpose, including acrylonitrile-butadienestyrene (ABS) and polycarbonates, modified polystyrenes the most satisfactory due to their excellent physical properties in combination with their low cost. Polystyrene by itself will not meet the desired high heat resistant requirements of automotive vehicle specifications. The inclusion of small but controlled amounts of chemical modifying agents to effect a copolymerization of styrene and such chemical modifiers has been found to provide a significant increase in the Tg temperature of the modified polymers, rendering them eminently suitable for use in the practice of the present invention. Such modified polystyrene polymers include copolymers of styrene with ionomers such as acrylic, methacrylic, fumaric, itaconic, and sulfonic acid, as well as maleic anhydride, and copolymers with monomers such as alpha-methylstyrene, 2-5 dichlorostyrene, and the like. Of the foregoing chemical modifiers, the use of maleic anhydride in amounts so as to comprise from about 2% up to about 15% by weight of the copolymer has been found particularly satisfactory. Such a copolymer containing about 8% maleic anhydride by weight is commercially available under the brand designation Dylark 232 from Arco/Polymers, Inc. The foregoing polymer has been found eminently satisfactory for forming the foam layer of the composite laminar sheet.

The films of the composite laminar sheet may be comprised of the same resin as the foam core, although generally, resins providing for a higher impact resistance are desirable. An improvement in the impact resistance of such low-cost modified polystyrene resins can be economically effected by incorporation of controlled amounts of butadiene, imparting impact strengths as determined by the Izod impact method to a value of at least 2.7 foot pounds per inch. For example, the inclusion of from about 6% to about 12% of butadiene in a maleic anhydride modified styrene copolymer provides a resin eminently suitable for use in fabricating the films of the composite laminar sheet. A resin of the foregoing type containing about 88% styrene, about 3.2% maleic anydride and about 8.8% butadiene by weight, is commercially available under the brand name Dylark 250 from Arco/Polymers, Inc.

The composite laminar panel 12, as shown in FIG. 3, can be produced by any one of a variety of techniques, such as forming the films 14 and 16 separately from the core 18 and thereafter bonding the films to the face surfaces of the foam core employing adhesive or solvent bonding or heat sealing into an integral laminate. Preferably, the composite laminate is produced by coextrusion of the films directly onto the surfaces of a foam core layer employing a technique such as fully described in U.S. Pat. No. 3,616,020, the substance of which is incorporated herein by reference. Briefly stated, the process comprises continuously extruding a film of the thermoplastic resin through a die directly onto the heat-fusible foam sheet which moves past the die. The foam sheet having the extruded film on one face thereof is next compressed between rolls, one of which is a chill roller and the other a nip roller, preferably heated to an elevated temperature depending upon the specific nature of the thermoplastic resin used. The heat capacity of the hot thermoplastic film, in combination with the heat applied through the nip roll, effects a melting of a thin layer of the heat-fusible foam sheet, effecting a mutual fusion which upon cooling provides a tenacious bond over the entire interface therebetween.

Figure 4:
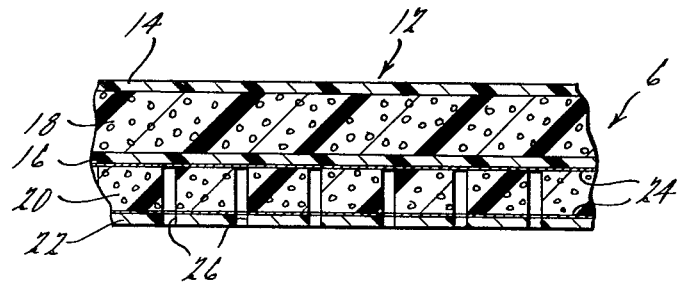
FIG. 4 is a fragmentary magnified transverse sectional view of the headliner as emcompassed within the dotted line indicated at 4 of FIG. 2.

The composite laminar sheet 12, as shown in FIG. 3, can be employed directly as a decorative trim panel and its appearance can be enhanced by various pigmentation, coloration and/or embossments incorporated in or applied to one or both of the films. Preferably, the surface of the film exposed to the interior of the passenger compartment is provided with a suitable decorative coating to further enhance aesthetic characteristics of the trim panel and to conform with the decor of the passenger compartment. Decorative coatings or layers suitable for this purpose include a flocking treatment employing fibers of various types, the application of coatings such as decorative paintings to the film surface, the lamination or bonding of various fabrics of a woven or non-woven type, the bonding of pigmented and/or embossed films such as vinyl films, the bonding of a layer of a resilient foam directly to the outer surface of the laminate, as well as combinations thereof. Particularly satisfactory results are achieved in accordance with the arrangement as illustrated in FIG. 4 of the drawing, in which the headliner assembly 6 comprising the laminar panel 12 including films 14 and 16 and the foam layer 18 is further provided with a resilient foam layer 20 having an embossed vinyl film 22 bonded to the exterior surface thereof. The resilient foam layer 20 is adhered to the outer surface of the film 16 and the inner surface of the vinyl sheet 22 by means of suitable adhesive layers 24. The aesthetic and sound insulating characteristics of the decorative coating are further enhanced by the provision of a plurality of perforations 26, which extend through the vinyl sheet and resilient foam layer 20 and are distributed in a uniform pattern over the entire surface of the headliner.

The application of the decorative coating can be achieved prior to, during or subsequent to the thermoforming of the laminar sheet, depending upon the type of coating and the manner by which it is bonded to the face of the laminar sheet. The thermoforming of the laminar sheet itself can be achieved by any one of a variety of commercially available techniques, of which the vacuum forming operation constitutes a particularly preferred technique, enabling the inclusion of various localized embossments in the panel. In any event, the laminar sheet with or without the decorative coating thereon is preheated to a temperature above its glass transition temperature to effect a sufficient heat softening thereof, whereafter is is molded and retained in the molded or deformed condition until sufficient cooling occurs so as to retain the shape imparted thereto. Laminar sheets comprised of films composed of the Dylark 250 modified polystyrene resin and Dylark 232 foam core layer are satisfactorily molded by preliminarily heating such sheets to a temperature in the range of about 250° F. to about 350° F., such as in a hot air circulating oven or by radiant heaters, whereafter the preheated sheet is placed in a mold and a vacuum is applied to effect a drawing of the sheet into conformance with the mold contour. A retention of the sheet for a period of about 20 seconds in contact with the mold surface is usually required to permit a cooling thereof to a temperature below the Tg temperature, whereafter the molded sheet is withdrawn and is trimmed. Satisfactory headliners having a draw depth of up to about 8 inches can be satisfactorily produced in accordance with this technique.

The molded panel, upon removal from the mold, is thereafter trimmed along the sides thereof and suitable apertures are cut to accommodate accessory items, such as a dome light, etc. Installation into a vehicle is simply achieved by slightly deforming the panel, such that the edges engage the interior trim rails, and thereafter permitting the panel to resiliently spring back to substantially its original configuration, forming a snap-fit. Road tests of the headliner reveal no noticeable "flutter" due to air impact while the vehicle is driven with the windows open. Further testing of the headliner at elevated temperatures reveals no significant sag or blistering while subjected to temperatures of 200° F. for periods of 24 hours. The decorative characteristics of the panel are further enhanced by applying a decorative material comprising a 10 mil embossed vinyl film bonded at a 100 mil resilient polyurethane foam sheet, which is perforated to achieve aesthetic and/or acoustical effects, and wherein the entire assembly is bonded to the concave surface of the contoured laminar sheet.

While it will be apparent that the preferred embodiments of the invention are well calculated to fulfill the objects above stated, it will be appreciated that the invention is susceptible to modification, variation and change without departing from the spirit thereof.

What is claimed is:

1. A contoured resilient vehicle trim panel comprising a composite laminar sheet consisting of a pair of inperforate thermoplastic films disposed in spaced-apart relationship and tenaciously bonded in supported relationship to the face surfaces of an intervening coextensive thermoplastic foam layer, said films being of a thickness of about 3 mils to about 60 mils and said foam core layer being of a thickness of about 1/32 to about 1 inch and of a density of about 3 to about 6 pounds per cubic foot, said foam core layer composed of a thermoplastic polymer consisting of a modified polystyrene copolymer containing from about 2% to about 15% by weight maleic anhydride having a tensile strength of at least 7,800 psi, and a tensile modulus of at least $4.5 \times 10^5$ psi; said films composed of a thermoplastic polymer consisting of a modified polystyrene copolymer containing from about 2% to about 15% by weight maleic anhydride and about 6% to about 12% by weight butadiene having a tensile strength of at least 4,500 psi, a tensile modulus of at least $3.2 \times 10^5$, and an Izod impact strength of at least about 2.7 foot pounds per inch; said thermoplastic polymer of said foam core layer and said films having a glass transition temperature of at least 235° F.

2. The trim panel as defined in claim 1, in which said films are of a thickness ranging from about 5 up to about 15 mils and said foam core layer ranges in thickness from about 1/16 to about ½ inch.

3. The trim panel as defined in claim 1, further including a decorative layer overlying the exterior surface of one of said films and secured thereto.

4. The trim panel as defined in claim 3, in which said decorative layer comprises a foam layer bonded to said exterior surface of said one of said films and a fabric bonded to the outer surface of said foam layer.

5. The trim panel as defined in claim 1, in which the maleic anhydride content of said copolymer ranges from about 5% up to about 10% by weight of said polymer.

6. The trim panel as defined in claim 1, in which said copolymer of which said foam layer is composed comprises about 92% styrene and about 8% maleic anhydride.

7. The trim panel as defined in claim 1, wherein said modified polystyrene resin of which said films are composed consists of a copolymer containing about 88% styrene, about 3% maelic anhydride and about 9% butadiene.

* * * * *